United States Patent
De Souza

(10) Patent No.: US 9,460,234 B2
(45) Date of Patent: Oct. 4, 2016

(54) SYSTEM AND METHOD OF DETERMINING COMPLEXITY OF COLLABORATIVE EFFORT

(71) Applicant: VALE S.A., Rio de Janeiro (BR)

(72) Inventor: Cleidson Ronald Botelho De Souza, Belem (BR)

(73) Assignee: VALE S.A., Rio de Janeiro (BR)

( * ) Notice: Subject to any disclaimer, the term of this patent is extended or adjusted under 35 U.S.C. 154(b) by 201 days.

(21) Appl. No.: 14/134,969

(22) Filed: Dec. 19, 2013

(65) Prior Publication Data
US 2014/0172920 A1    Jun. 19, 2014

Related U.S. Application Data

(60) Provisional application No. 61/739,579, filed on Dec. 19, 2012.

(51) Int. Cl.
*G06F 17/30*  (2006.01)
*G06Q 10/06*  (2012.01)

(52) U.S. Cl.
CPC ....... *G06F 17/30958* (2013.01); *G06Q 10/063* (2013.01)

(58) Field of Classification Search
CPC .................. G06F 17/30292; G06F 17/30958; G06F 17/30961; G06Q 10/063; G06Q 10/06375; G06Q 50/01
USPC .......................... 707/608, 797, 798; 705/319
See application file for complete search history.

(56) References Cited

U.S. PATENT DOCUMENTS

| | | | | |
|---|---|---|---|---|
| 7,890,549 B2* | 2/2011 | Elad | ...... | G06Q 10/10 707/803 |
| 8,024,700 B2* | 9/2011 | Cantor | ...... | G06Q 10/06 717/104 |
| 8,572,129 B1* | 10/2013 | Lee | ...... | G06F 17/30861 707/798 |
| 8,635,281 B2* | 1/2014 | Kelly | ...... | G06Q 10/10 709/205 |
| 8,977,611 B2* | 3/2015 | Tseng | ...... | G06F 17/30722 705/319 |
| 2005/0080655 A1* | 4/2005 | Sengir | ...... | G06Q 10/0633 705/7.27 |
| 2007/0265864 A1* | 11/2007 | Chess | ...... | G06Q 50/01 705/319 |
| 2007/0282645 A1* | 12/2007 | Brown | ...... | G06Q 10/063 705/7.11 |
| 2011/0251971 A1* | 10/2011 | Bethea | ...... | G06Q 50/01 705/319 |
| 2013/0166601 A1* | 6/2013 | Chrapko | ...... | G06Q 10/00 707/798 |

* cited by examiner

Primary Examiner — Greta Robinson
(74) Attorney, Agent, or Firm — Arent Fox LLP

(57) ABSTRACT

A method of determining the complexity of a collaborative effort which method includes receiving data via a processor, the data including identities of social actors or sets of social actors in the collaborative effort, and storing the data in a repository accessible by the processor; defining nodes, via the processor, and associating the nodes with each of the social actors of or with each of the sets of social actors in the collaborative effort to define nodes that represent each of the social actors or each of the sets of social actors; identifying, via the processor, one or more dimensions for each social actor; defining a coordination complexity (G), via the processor, and determining, for each dimension, a sum of a difference between every two of the nodes, multiplying the sum by a weight specific for that dimension, and adding each of the multiplied sums for each dimension. In another aspect, the invention includes a system of determining complexity of a collaborative effort.

22 Claims, 5 Drawing Sheets

SYSTEM AND METHOD OF DETERMINING COMPLEXITY OF COLLABORATIVE EFFORT

CROSS-REFERENCE TO RELATED APPLICATION(S)

This application claims priority from U.S. Patent Application No. 61/739,579, titled "SYSTEM AND METHOD OF DETERMINING COMPLEXITY OF A COLLABORATIVE EFFORT" filed on Dec. 19, 2012, and which is incorporated herein by reference in its entirety.

BACKGROUND OF THE INVENTION

Nowadays it is more and more common the existence of projects in which the involved participants are located at different sites, which might even be different countries. A project is an example of a collaborative effort. Another example of a collaborative effort is the development of a software system, which is seldom developed by a single social actor.

BRIEF SUMMARY OF THE INVENTION

The present invention describes a system and method to compute the complexity of the coordination of a given set of social actors when performing a collaborative effort. The present invention is directed to improving the method of managing a given set of social actors when performing a collaborative effort, using a system and a method to compute the complexity of the coordination of this effort.

Aspects of the present invention are directed to a method of determining the complexity of a collaborative effort, comprising the steps of: receiving data by a processor, the data comprising identities of social actors or sets of social actors in the collaborative effort and storing the data in a repository accessible by the processor; defining nodes, by the processor, and associating the nodes with each of the social actors or with each of the sets of social actors in the collaborative effort to define nodes that represent each of the social actors or each of the sets of social actors; identifying, by the processor, one or more dimensions for each social actor or each of the sets of social actors; defining a coordination complexity (G) (calculated by the Formula (I) presented below), by the processor, and determining, for each dimension, a sum of a difference between every two of the nodes, multiplying the sum by a weight specific for that dimension, and adding each of the multiplied sums for each dimension.

Formula (I) that computes the overall coordination complexity (G):

$$(G)=\Sigma\downarrow(\text{dimension}=1)\uparrow(\text{dimension}=N)[[((\Sigma\downarrow i\uparrow j[([\text{Node}])\downarrow i])-[\text{Node}]\downarrow j)]\downarrow(\text{Dimension } N)*\delta\downarrow(\text{Dimension } N)]$$

In another aspect, the present invention provides a system configured to perform the presented method, including a specially programmed computer device having components configured to perform aspects of the method provided by the present invention.

In one aspect, the invention provides a system of determining complexity of a collaborative effort comprising: a processor; a user interface functioning via the processor; and a repository accessible by the processor; wherein the processor is configured to: receive data comprising nodes, edges and weights; store the data in the repository; process the data by executing an algorithm or function stored in the repository; create a graph representation of the processed data that may be displayed on the user interface; determine a coordination complexity (G) according to a formula (I):

$$(G)=\Sigma\downarrow(\text{dimension}=1)\uparrow(\text{dimension}=N)[[((\Sigma\downarrow i\uparrow j[([\text{Node}])\downarrow i])-[\text{Node}]\downarrow j)]\downarrow(\text{Dimension } N)*\delta\downarrow(\text{Dimension } N)];$$

optionally, filter out the edges; determine the weights based on pre-determined information stored in the repository; and determine the nodes via social network metrics received by the processor.

DETAILED DESCRIPTION OF THE INVENTION

Figure 1:
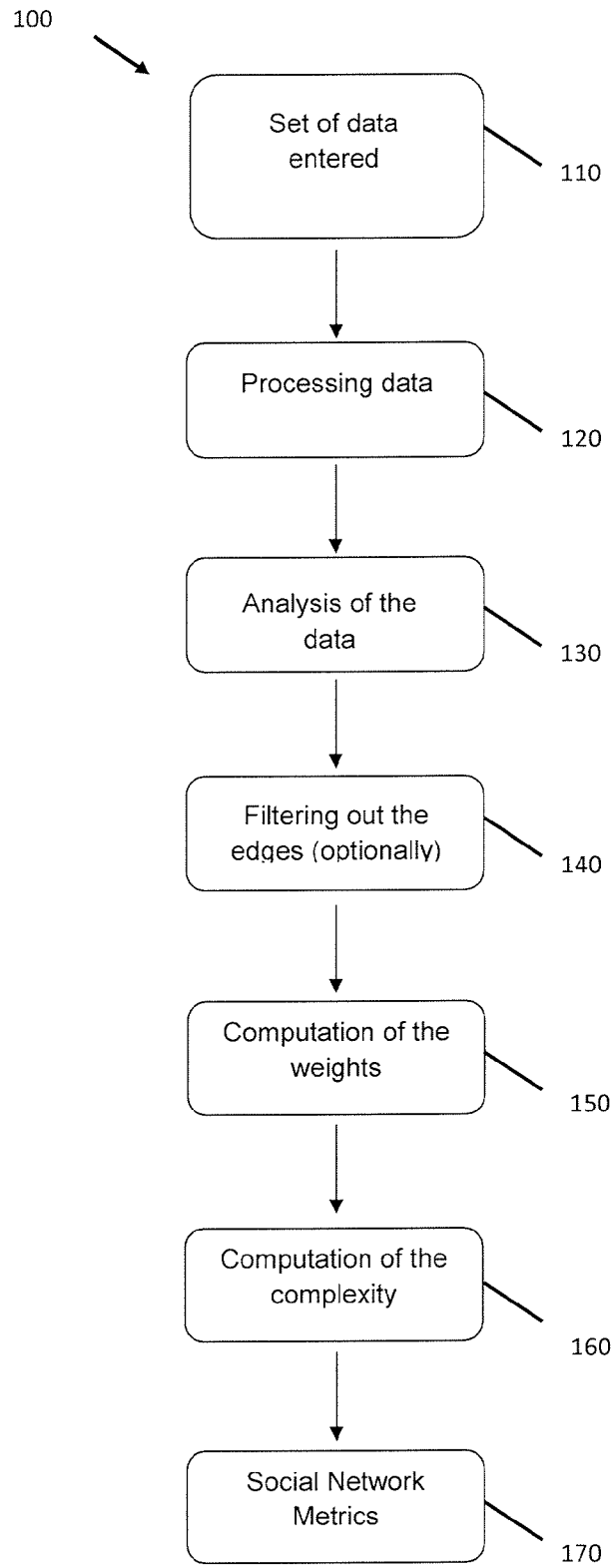
FIG. 1 is a flowchart of the automatic method provided by the present invention.

The present invention shall now be described in greater detail based on an example of execution represented in the drawing.

The invention is useful for a collaborative effort to determine how complex, or simple, the collaborative effort will be, given the context of the social actors working on the collaborative effort.

"Context" may mean different aspects of the collaborative effort to be carried out including:

1. The number of social actors involved in the collaborative effort;
2. The organizational membership of the social actors involved in the collaborative effort;
3. The geographical location of each social actor involved in the collaborative effort and the associated time-zone of these locations;
4. The languages spoken by each social actor involved in the collaborative effort;
5. The nationality of each social actor involved in the collaborative effort;
6. The previous experience in working together of the social actors involved in the collaborative effort;
7. The degree of interdependency among the tasks being carried out by each pair of social actors involved in the collaborative effort;
8. The availability of synchronous and asynchronous collaborative tools available to each social actor;
9. The mechanisms (including tools) available to each social actor that facilitate informal communication among the actors involved in the collaborative effort.

Each one of the aspects above may be referred to as a dimension. Note that the values associated with each dimension are not important per se, because the system and method analyze the difference between the values of each dimension of any two social actors.

In operation, for a given collaborative effort, the social actors are identified along with one or more of the above mentioned dimensions, and the dimensions of each social actor information are input into a specially-programmed computer system that implements this invention, e.g., based on the actions described herein, so that this system can compute the coordination complexity (G) of the analyzed collaborative effort. The resulting coordination complexity (G) is a numeric value, calculated by the Formula (I) presented below, that suggests the amount of coordinative work required by the social actors to perform the collaborative effort.

Formula (I) that computes the overall coordination complexity (G):

$$(G) = \Sigma \downarrow (\text{dimension}=1) \uparrow (\text{dimension}=N) [[((\Sigma \downarrow i \uparrow j [([\text{Node}]) \downarrow i]) - [\text{Node}] \downarrow j)] \downarrow (\text{Dimension } N) * \delta \downarrow (\text{Dimension } N)]$$

Based on the result, the processor may receive instructions to change aspects of the collaborative effort as a way of reducing the amount of coordinative work required to perform that effort. The processor may also receive instructions to automatically change aspects to reduce the amount of coordinative work. Examples of change include, adding collaborative tools to facilitate the coordination, replacing social actors, increasing the number of traveling by specific social actors, etc. More specifically, the processor can be instructed to change one or more of the social actors in the collaborative effort based on the coordination complexity (G) in order to reduce the value of the coordination complexity after a re-computation (i.e., a re-computed coordination complexity).

Figure 2:
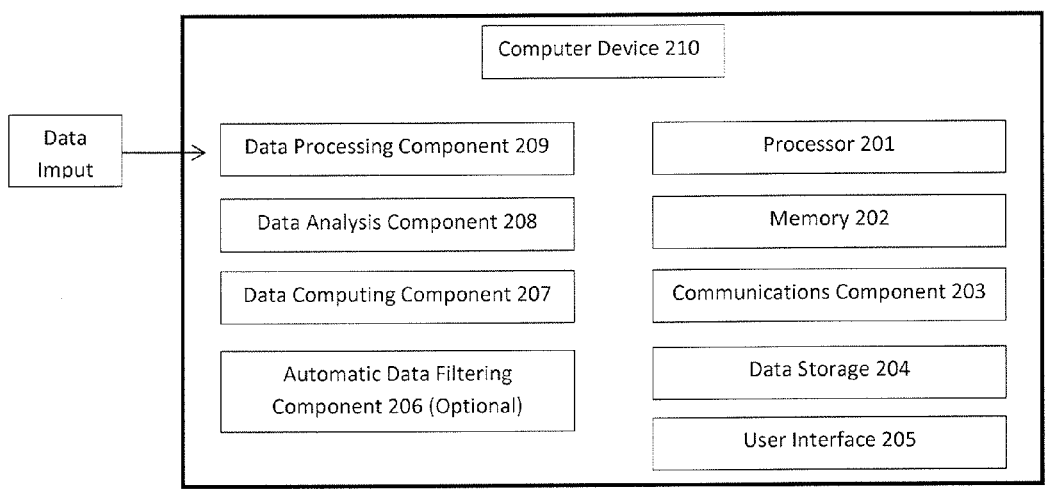
FIG. 2 is a system, including a computer device having components configured to perform aspects of the automatic method provided by the present invention.

In particular, referring to FIGS. 1 and 2, a system 200 may be configured to perform aspects of the method 100 for the classification of the determining the complexity of a collaborative effort.

1) The system 200 includes a computer device 210, at 110 of method 100, such as, for example, a laptop or tablet, wherein the data may be entered (nodes, edges and weights).
2) The computer device 210, at 120 of method 100, processes the data, e.g., via a data processing component 209, which may be software and/or hardware executing one or more algorithm or function, such as, a specially-programmed computer system.
3) Next, the computer device 210, at 130 of method 100, analyzes the data entered, via a data analysis component 208, e.g., creating a graph (Cormen, Leiserson and Rivest, 1990) representation that may include one or more nodes and one or more edges. This graph is an undirected graph (i.e., its nodes are connected by edges that are bidirectional) (Cormen, Leiserson and Rivest, 1990), each node represents either a person or a team that includes a set of actors and has a value assigned to each one of its different dimensions. For instance, an actor's value to the organizational membership dimension will indicate the team of which this actor is a member; if a node is a team, which includes a set of actors, then we use the most frequent value for a given dimension for the social actors located in this team. The edges are used to represent the difference between the dimensions of the collaborative effort of each node. For example, an edge between two nodes is used to indicate that there is a difference between the time-zones of these two nodes. In an aspect, the values of a given dimension for each node may not be important, but instead what is important is to represent that there is a difference between the nodes for a given dimension. This difference between the nodes for a given dimension is likely to create additional complexity to collaborative efforts, increasing the amount of necessary coordination.
4) After the processing, analysis and computation of the data, filtering out the edges, optionally, may be performed, at 140 of method 100. The process can be configured to filter out the edges automatically via an automatic data component 206, or manually based on instructions received through the user interface. In the previous processing step, it is necessary to compare each pairs of nodes to find out whether there is a difference in their contexts, and therefore whether there is an edge between them. In other words, the previous approach assumes the coordination between all pairs of nodes is important. This step can be simplified because often, not all pairs of nodes might need to coordinate their work. For instance, in a software development project, nodes (which might indicate either software developers or teams) are more likely to engage in coordination efforts with other nodes they depend on or that depends on them. Therefore, a variation of the approach described in the previous step only takes into account the coordination complexity of a subset of the pairs of nodes. This subset might be determined manually or automatically using dependency analysis techniques including but not limited to (Podgurski and Clarke 1989), (Vieira and Richardson 2002), and (Stafford and Wolf 2001). The user of this system and method decides the approach to be used, automatic or manual.
5) Next, the computer device 210, at 150 of method 100, computes the weights, via a data computing component 207 such as a processor, according to the approach selected by the user. Independently whether the full graph or a subset of the graph is taken into account in the previous step, an aspect of the method described in this invention includes an approach to compute the weights of each dimension. A possibility is to store data in a repository accessible by the processor (e.g., a memory device) containing the results of interviews (McCracken, 1998) with experts in the collaborative effort being analyzed to identify which weights they would assign for each dimension based on their previous experience with efforts in similar "contexts". Interviews in this case could be conducted individually or in groups of experts using a focus group approach (Krueger and Casey, 2008) and then, the weights may be calculated either through the average weight attributed for each dimension or by reaching a consensus among the interviewee. Another approach is to use machine-learning techniques (e.g., Bayesian networks (Ben-Gal, 2007)) to compute the weights based on a database of previous collaborative efforts that took place in similar "contexts". Finally, a third approach is to use simulation methods (Rubinstein and Kroese, 2007) to identify these weights based on a subset of the database of previous collaborative efforts that took place in similar "contexts", and then evaluate and refine these values in the rest of the database.
6) Then, the computer device 210, at 160 of method 100, computes the Coordination Complexity (G), via data computing component 207. For each dimension, the summation of the differences between every two nodes of the graph is computed by summing the values of the edges. This summation indicates, for a given dimension, how different the social actors involved in the collaborative effort under analysis are. This sum is then multiplied by a weight (e.g., a weighting factor) that is specific for that dimension. Adding the results of the multiplication between the sum and the weight for all dimensions provides the overall coordination complexity of the effort. More specifically, the overall coordination complexity (G) is computed in the formula (I) represented below:

$$(G) = \Sigma\downarrow(\text{dimension}=1)\uparrow(\text{dimension}=N)[[((\Sigma\downarrow i \uparrow j [([\text{Node}])\downarrow i]) - [\text{Node}]\downarrow j)]\downarrow(\text{Dimension } N)*\delta\downarrow(\text{Dimension } N)]$$

where G={V, E} such that V and E are finite sets that describe the different dimensions (context) of the collaborative effort to be carried out. V represents the set of vertices or nodes, and E represents the set of Edges. Therefore, "i" and "j" represent every two nodes in this graph.

7) It is important to note that in the formula (I) above presented, the weights are distributed in a way that the sum of all of the weights is 1. Because of that, the computed coordination complexity (G) does not need to be normalized since the sum of all weights is 1. In a variation of this invention, if the values of the weights do not need to sum to 1, then the overall coordination complexity (G) needs to normalized, i.e., the overall result must be divided by the sum of all the weights. Finally, the computer device 210, at 170 of method 100, may use social network analysis (Wasserman and Faust, 1994) to find out relevant nodes in the graph, via data computing component 207. This is done by computing social network metrics in the graph representation of the collaborative effort. For instance, the degree centrality (Wasserman and Faust, 1994) metric can be computed to determine the node of the graph with the largest number of edges, and therefore, the one that will likely face the largest coordination effort.

The computer device 210 also may include a processor 201 for carrying out processing functions associated with one or more of the components and functions described herein. The processor 201 can include a single or multiple set of processors or multi-core processors. Moreover, the processor 201 can be implemented as an integrated processing system and/or a distributed processing system.

The computer device 210 also may include a memory 202, such as for storing data used herein and/or local versions of applications being executed by processor 201. The memory 202 can include any type of memory usable by a computer, such as random access memory (RAM), read only memory (ROM), tapes, magnetic discs, optical discs, volatile memory, non-volatile memory, and any combination thereof.

The computer device 210 also may include a communications component 203 that provides for establishing and maintaining communications with one or more entities utilizing hardware, software, and services as described herein. The communications component 203 may carry communications between components within the computer device, as well as between the computer device and external devices, such as devices located across a communications network and/or devices serially or locally connected to the computer device. For example, the communications component 203 may include one or more buses, and may further include transmit chain components and receive chain components associated with one or more transmitters and receivers, respectively, or one or more transceivers, operable for interfacing with external devices.

The computer device 210 also may include a data store 204, which can be any suitable combination of hardware and/or software, that provides for mass storage of information, databases, and programs employed in connection with aspects described herein. For example, the data store 204 may be a data repository for applications not currently being executed by the processor 201. The computer device 210 also may include a user interface component 205 operable to receive inputs from a user of the computer device 210, and further operable to generate outputs for presentation to the user. The user interface component 205 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, the user interface component 205 may include one or more output devices, including but not limited to a display, a speaker, a haptic feedback mechanism, a printer, any other mechanism capable of presenting an output to a user, or any combination thereof.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

The present invention may be implemented using hardware, software, or a combination thereof and may be implemented in one or more computer systems or other processing systems. In one aspect, the invention is directed toward one or more computer systems capable of carrying out the functionality described herein. An example of such a computer system 300 is shown in FIG. 3.

Figure 3:
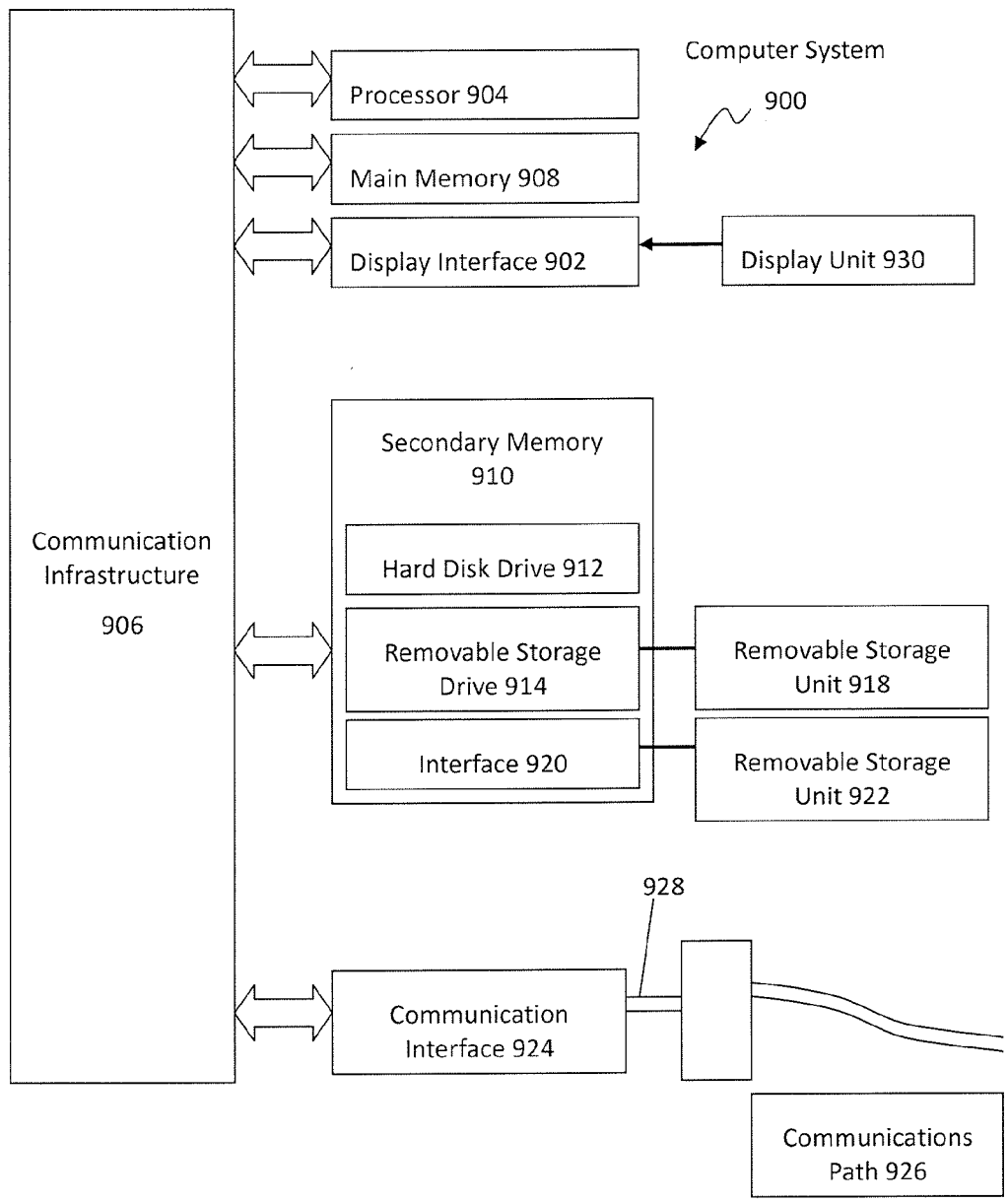
FIG. 3 presents an exemplary system diagram of various hardware components and other features, for use in accordance with aspects of the present invention.

FIG. 3 presents an example system diagram of various hardware components and other features, for use in accordance with an aspect of the present invention. Aspects of the present invention may be implemented using hardware, software, or a combination thereof and may be implemented in one or more computer systems or other processing systems. In one exemplary variation, aspects of the invention are directed toward one or more computer systems capable of carrying out the functionality described herein. An example of such a computer system 900 is shown in FIG. 3.

Computer system 900 includes one or more processors, such as processor 904. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement aspects of the invention using other computer systems and/or architectures.

Computer system 900 may include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 970, and signals 928. These computer program products provide software to the computer system 900. Aspects of the invention are directed to such computer program products.

Computer programs (also referred to as computer control logic) are stored in main memory 908 and/or secondary memory 910. Computer programs may also be received via communications interface 924. Such computer programs, when executed, enable the computer system 900 to perform various features in accordance with aspects of the present invention, as discussed herein. In particular, the computer programs, when executed, enable the processor 910 to perform such features. Accordingly, such computer programs represent controllers of the computer system 900.

In variations where aspects of the invention are implemented using software, the software may be stored in a computer program product and loaded into computer system 900 using removable storage drive 914, hard drive 912, or communications interface 920. The control logic (software), when executed by the processor 904, causes the processor 904 to perform the functions in accordance with aspects of the invention as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the invention are implemented using a combination of both hardware and software.

Figure 4:
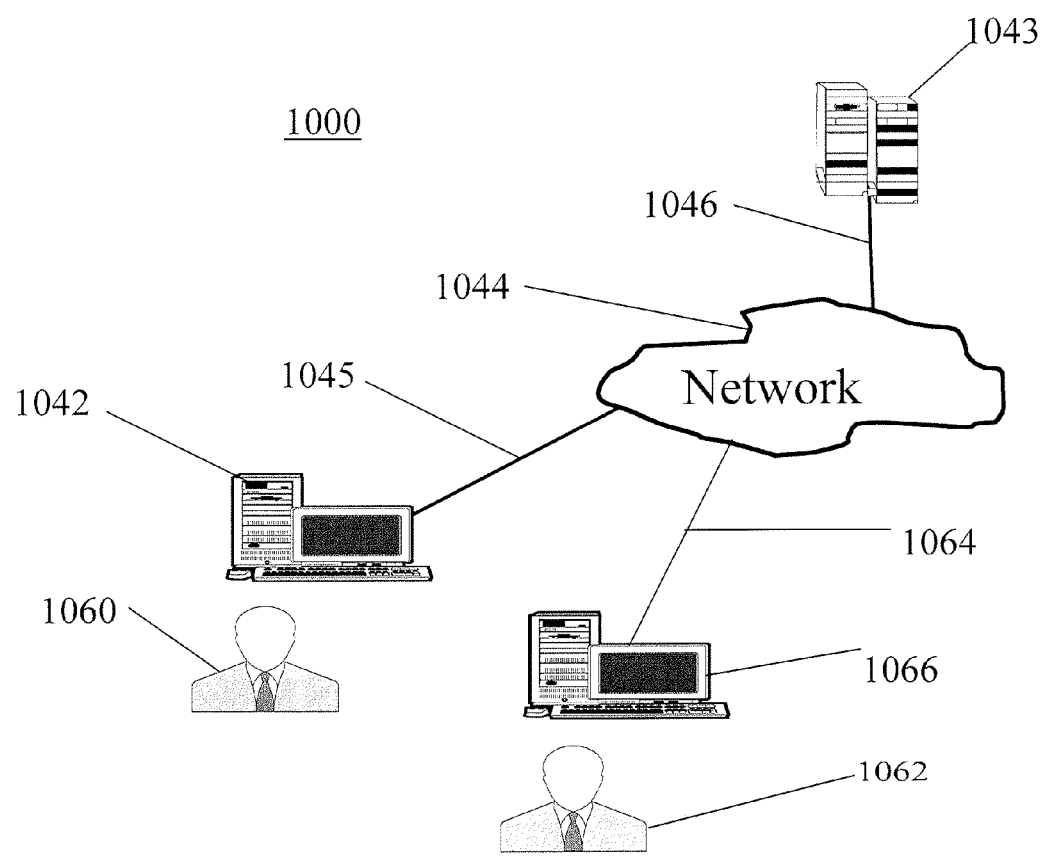
FIG. 4 is a block diagram of various exemplary system components, in accordance with aspects of the present invention.

FIG. 4 is a block diagram of various example system components, in accordance with an aspect of the present invention. FIG. 4 shows a communication system 1000 usable in accordance with the present invention. The communication system 1000 includes one or more accessors 1060, 1062 (also referred to interchangeably herein as one or more "users") and one or more terminals 1042, 1066. In one aspect, data for use in accordance with aspects of the present invention is, for example, input and/or accessed by accessors 1060, 1062 via terminals 1042, 1066, such as personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 1064. The couplings 1045, 1046, 1064 include, for example, wired, wireless, or fiberoptic links. In another example variation, the method and system in accordance with aspects of the present invention operate in a stand-alone environment, such as on a single terminal.

Figure 5:
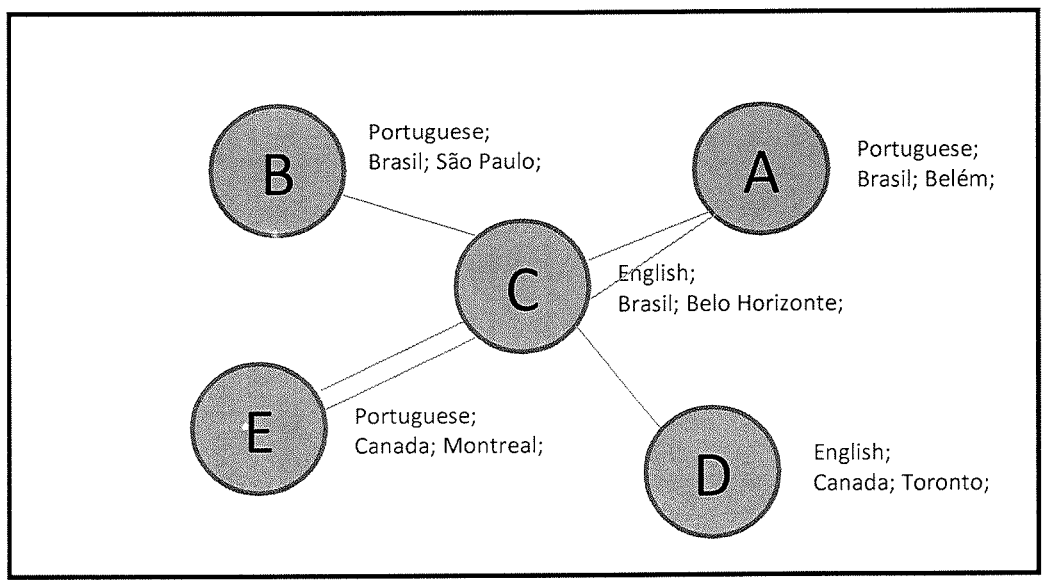
FIG. 5 is a graph provided by the system for the Example 1.

FIG. 5 shows the Undirected Graph of the example provided, i.e., one embodiment of a coordination effort.

EXAMPLE

In this case, the nodes A, B, C, D, and E represent social actors involved in a collaborative effort. The edges connecting some of these nodes indicate that the social actors associated with the edges are different in one dimension of the context. The referred effort is to develop a project in Brazil, Belo Horizonte.

A is an actor that speaks Portuguese and who lives in Belém, Brazil; B speaks Portuguese and lives in Sao Paulo, Brazil; C speaks English and lives in Belo Horizonte, Brazil; D speaks English and lives in Toronto, Canada; E speaks Portuguese and lives in Montreal, Canada. Table 1 provided below shows the nodes and the dimensions of each node of this example. Table 2 provided below illustrates the edges of this example indicating the reason why the edge exists between two nodes and the dimension in which the nodes are different. Note that, for this example, not all possible edges are represented in the graph.

TABLE 1

Nodes and their Dimensions

| Nodes (social actors) | Dimensions of each node | | |
|---|---|---|---|
| A | Language: Portuguese; | Country: Brazil | City: Bélem |
| B | Language: Portuguese; | Country: Brazil | City: São Paulo |
| C | Language: English; | Country: Brazil | City: Belo Horizonte |
| D | Language: English; | Country: Canada | City: Toronto |
| E | Language: Portuguese; | Country: Canada | City: Montreal |

TABLE 2

Edges

| Edge | Dimension | Difference between the nodes of the Edge, i.e, the reason why an Edge exists |
|---|---|---|
| A-C | Language | A speaks Portuguese while C speaks English |
| A-C | Location | A is located in Bélem, Brazil while C is located in Belo Horizonte, Brazil |
| B-C | Location | B is located in São Paulo, Brazil while C is located in Belo Horizonte, Brazil |
| C-D | Location | C is located in Belo Horizonte, Brazil while D is located in Toronto, Canad |
| C-E | Location | C is located in Belo Horizonte, Brazil while E is located in Montreal, Canad |
| C-E | Language | C speaks English while E speaks Portuguese |

The edge connecting nodes A and B indicates that A and B are likely to face challenges coordinating their work due to the fact that they live in different cities. Similarly, there are two edges from A to C, because these two social actors are located in different cities and speak different languages, which means they will require a greater effort to collaborate.

The overall collaborative effort of this project is computed by calculating the summation of the result between the number of edges that exist in the graph for a given dimension (language, location, etc) multiplied by the weight of this dimension. As an example, having in mind the location of the project, the values of the edges and weights vary according to the distance to Belo Horizonte and the language, preferably Portuguese. The values of the edges for a given dimension represent the difference between the values of this same dimension for the nodes linked by this edge. More details will be presented below.

TABLE 3

Details of the Edges and Weights

| Edges | Difference in values between the nodes for a dimension informed to the computer system, varying from 1 (more favorable) to 10 (less favorable). | Weights Method adopted: interviewing experts in the collaborative effort being analyzed. |
|---|---|---|
| A-C (location) | 5 | 0.5 |
| B-C (location) | 1 | 0.5 |
| C-D (location) | 8 | 0.5 |
| C-E (location) | 8 | 0.5 |
| A-C (language) | 10 | 0.3 |
| C-E (language) | 10 | 0.3 |

TABLE 4

Calculation of the G

| Dimension | Summation of the value of the Edges | Summation of the Edges multiplied by the Weight |
|---|---|---|
| Location | 5 + 1 + 8 + 8 = 22 | 22 * 0.5 = 11 |
| Language | 10 + 10 = 20 | 20 * 0.3 = 6 |
| | G (Complexity) | 17 |

For this example, given the graph described in FIG. 5, it is possible to compute the coordination complexity as described in Table 3. By computing the degree centrality (Wasserman and Faust, 1994) of each node in the graph it is also possible to identify that the node C is the one with the largest coordination effort, since it is the one with the largest degree centrality. For the user of this invention, this information can suggest that node C might need extra-time to conclude his/her tasks, or might want to use additional collaboration tools to facilitate his/her work, and so on. The decision about what needs to be done is left to the user of the invention, and is not included in the scope of this invention.

Although a preferred operational process has been described and illustrated, it is pointed out that alterations in this process are possible and executable, without digressing from the scope of the present invention, and the given example do not intend to limit the scope of this invention.

I claim:

1. A method of determining complexity of a collaborative effort comprising:
   receiving data via a processor, the data comprising identities of social actors or sets of social actors in the collaborative effort, and storing the data in a repository accessible by the processor;
   defining nodes, via the processor, and associating the nodes with each of the social actors or with each of the sets of social actors in the collaborative effort, the nodes representing each of the social actors or each of the sets of social actors;
   identifying, via the processor, one or more dimensions for each social actor or for each set of social actors;
   defining edges between a pair of actors or a pair of a set of social actors, via the processor, and associating the edges with the difference in the values of the dimensions for each social actor or for each set of social actors;
   defining a coordination complexity (G), via the processor, based on determining, for each dimension, a summation of the respective difference in value associated with the respective edge between every two of the nodes, multiplying the summation by a weight specific for that dimension, and adding each of the multiplied sums for each dimension; and
   displaying the coordination complexity (G) on a user interface functioning via the processor.

2. The method according to claim 1, further comprising receiving instructions to change one or more of the social actors or one or more of the sets of social actors in the collaborative effort based on the coordination complexity (G) in order to reduce a value of a re-computed coordination complexity.

3. The method according to claim 1, wherein the one or more dimensions is an item selected from the group consisting of: a number of social actors involved, an organizational membership of social actors, a geographical location of each social actor including the associated time-zone, a primarily language spoken by each social actor, a nationality of each social actor, a history of working together between social actors, a degree of interdependency among tasks carried out by one or more pairs of social actors, an availability of synchronous and asynchronous collaborative tools to be used by each social actor, mechanisms including tools available to each social actor that facilitate informal communication among the social actors.

4. The method according to claim 1, wherein a specially programmed computer comprises the processor and is adapted to compute the coordination complexity (G) of the collaborative effort.

5. The method according to claim 1, wherein the coordination complexity (G) is a numeric value indicative of an amount of coordinative work required by the social actors to perform the collaborative effort.

6. The method according to claim 1, further comprising receiving, via the processor, instructions to change one or more aspects of the collaborative effort to reduce an amount of coordinative work required to perform the collaborative effort.

7. The method according to claim 6, wherein the change to one or more aspects of the collaborative effort comprises adding collaborative tools for use by the social actors to facilitate one or more of coordination of social actors and replacement of social actors.

8. The method of claim 1, wherein defining the coordination complexity (G) further comprises determining the coordination complexity (G) according to a formula:

$$(G) = \Sigma \downarrow (\text{dimension}=1) \uparrow (\text{dimension}=N)[[((\Sigma \downarrow i \uparrow j [([\text{Node}]) \downarrow i]) - [\text{Node}] \downarrow j)] \downarrow (\text{Dimension } N) * \delta \downarrow (\text{Dimension } N)];$$

wherein a set of 1 to N represents each of the one or more dimensions of each node, wherein i and j represent respective different ones of the nodes, wherein ([Node])↓i])−[Node]↓j) defines a respective one of the edges that each represents the difference between the every two of the nodes in a respective dimension, and wherein δ↓(Dimension N) represents the weight specific for that dimension.

9. A system of determining complexity of a collaborative effort comprising:
   a processor;
   a user interface functioning via the processor; and
   a repository accessible by the processor;
   wherein the processor is configured to:
      receive data comprising nodes, edges and weights;
      store the data in the repository;
      process the data by executing an algorithm or function stored in the repository, including determine a coordination complexity (G) according to a formula (I):

$$(G) = \Sigma \downarrow (\text{dimension}=1) \uparrow (\text{dimension}=N)[[((\Sigma \downarrow i \uparrow j [([\text{Node}]) \downarrow i]) - [\text{Node}] \downarrow j)] \downarrow (\text{Dimension } N) * \delta \downarrow (\text{Dimension } N)]$$

wherein a set of 1 to N represents each of one or more dimensions of each node, wherein i and j represent respective different ones of the nodes, wherein ([Node])↓i])−[Node]↓j) defines a respective one of the edges that each represents a difference between respective different ones of the nodes in a respective dimension, and wherein δ↓(Dimension N) represents a respective weight specific for a respective dimension; and
      create a graph representation of the processed data adaptable for display on the user interface.

10. The system according to claim 9, wherein the graph representation is an undirected graph comprising one or more of the nodes and one or more of the edges.

11. The system according to claim 10, wherein each node represents a social actor or a set of social actors, each node comprising a plurality of dimensions wherein a value is assigned to each of the plurality of dimensions.

12. The system according to claim 11, wherein an edge connecting two nodes represent the existence of a difference between the val ues of the dimensions of these nodes.

13. The system according to claim 12, wherein each node comprises a plurality of dimensions, and wherein a summation of the differences between every two of the nodes of the graph representation is determined by subtracting the values of the edges for each dimension.

14. The system according to claim 11, wherein each node comprises a plurality of dimensions, and wherein a summation of the differences between every two of the nodes of the graph representation is determined by subtracting the values of the edges for each dimension.

15. The system according to claim 14, wherein the summation is multiplied by a weight specific for each dimension.

16. The system according to claim 11, wherein the processor is further configured to use Social Network Metrics to identify nodes in the graph representation with the largest coordination complexity.

17. The system according to claim 10, wherein the processor is configured to filter out the edges automatically or based on instructions received via the user interface.

18. The system according to claim 10, wherein the processor is configured to determine the weights based on an approach selected from the group consisting of:
    interviewing an expert participating in the collaborative effort;
    using a machine-learning technique to identify weights in a database of previous collaborative efforts;
    using simulation methods to identify the weights in the database of previous collaborative efforts based on a subset of the database of previous collaborative efforts; and
    determining the weights based on pre-determined information stored in the repository.

19. The system according to claim 9, further comprising filtering out the edges.

20. The system according to claim 9, further comprising determining the weights based on pre-determined information stored in the repository or received via the user interface.

21. The system according to claim 9, determining nodes with a largest coordination complexity via social network metrics received by the processor.

22. The system according to claim 9, further comprising one or more additional actions selected from the group consisting of:
    filtering out the edges,
    determining the weights based on pre-determined information stored in the repository, and
    determining nodes with a largest coordination complexity via social network metrics received by the processor.

* * * * *